United States Patent
Michaels et al.

(10) Patent No.: US 12,181,606 B2
(45) Date of Patent: Dec. 31, 2024

(54) LIDAR PIXEL WITH ACTIVE POLARIZATION CONTROL

(71) Applicant: Aurora Operations, Inc., Pittsburgh, PA (US)

(72) Inventors: Andrew Steil Michaels, Santa Clara, CA (US); Sen Lin, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 190 days.

(21) Appl. No.: 17/870,493

(22) Filed: Jul. 21, 2022

(65) Prior Publication Data

US 2022/0365177 A1  Nov. 17, 2022

Related U.S. Application Data

(63) Continuation of application No. 17/344,386, filed on Jun. 10, 2021, now Pat. No. 11,428,785.
(Continued)

(51) Int. Cl.
*G01S 7/481* (2006.01)
*B60W 60/00* (2020.01)
(Continued)

(52) U.S. Cl.
CPC ......... *G01S 7/4814* (2013.01); *B60W 60/001* (2020.02); *G01S 7/4911* (2013.01);
(Continued)

(58) Field of Classification Search
CPC .... G01S 7/4814; G01S 7/4911; G01S 17/931; G01S 7/493; G01S 17/34; G01S 7/4811;
(Continued)

(56) References Cited

U.S. PATENT DOCUMENTS 8,988,754 B2  3/2015  Sun et al.
9,476,981 B2  10/2016  Yaacobi et al.
(Continued)

FOREIGN PATENT DOCUMENTS

CN  109039620 A  12/2018
CN  110620744 A  12/2019
(Continued)

OTHER PUBLICATIONS

Caspers J. Niklas et al. "Active polarization independent coupling to silicon photonics circuit", Proceedings of SPEI, IEEE, US, vol. 9133, May 1, 2014, pp. 11 DOI: 10.1117/12.2049713.
(Continued)

*Primary Examiner* — Mohamed K Amara
(74) *Attorney, Agent, or Firm* — Dority & Manning, P.A.

(57) ABSTRACT

A light detection and ranging (LIDAR) pixel includes a splitter, a grating coupler, and a phase shifter. The grating coupler is configured to emit a transmit beam that is based on a combination of a first portion of light and a second portion of light received from a laser. One or more first interconnects and one or more second interconnects couple the splitter to the grating coupler. The phase shifter is coupled to the one or more first interconnects and configured to vary a phase of the first portion of the light relative to a phase of the second portion of the light.

20 Claims, 7 Drawing Sheets

Related U.S. Application Data (60) Provisional application No. 63/038,452, filed on Jun. 12, 2020.

(51) Int. Cl.
  *G01S 7/4911* (2020.01)
  *G01S 17/931* (2020.01)
  *G02F 1/01* (2006.01)

(52) U.S. Cl.
  CPC .......... *G01S 17/931* (2020.01); *G02F 1/0136* (2013.01); *B60W 2420/408* (2024.01)

(58) Field of Classification Search
  CPC ........ G01S 7/4918; G01S 7/499; G01S 17/42; G01S 17/894; B60W 60/001; B60W 2420/408; G02F 1/0136; G02B 27/106
  See application file for complete search history.

(56) References Cited

U.S. PATENT DOCUMENTS

| | | | |
|---|---|---|---|
| 10,338,321 | B2 | 7/2019 | Hosseini et al. |
| 10,495,794 | B2 | 12/2019 | Zhang et al. |
| 10,545,289 | B1 * | 1/2020 | Chriqui ................. G02F 1/31 |
| 10,571,569 | B2 * | 2/2020 | Montoya ............. G01S 7/4863 |
| 10,627,517 | B2 | 4/2020 | Yaacobi et al. |
| 10,761,272 | B2 | 9/2020 | Hosseini et al. |
| 11,150,411 | B2 | 10/2021 | Hosseini et al. |
| 11,372,106 | B2 | 6/2022 | Yaacobi et al. |
| 11,378,691 | B2 * | 7/2022 | Boloorian ............... G01S 17/34 |
| 11,428,785 | B2 * | 8/2022 | Michaels ................ G01S 17/34 |
| 11,573,294 | B2 * | 2/2023 | Sun ........................ G01S 7/4817 |
| 11,579,253 | B2 * | 2/2023 | Byrnes ................... G01S 7/4815 |
| 11,880,000 | B2 * | 1/2024 | Hosseini ................. G01S 7/491 |
| 11,892,543 | B2 * | 2/2024 | Barber .................... G01S 17/34 |
| 11,896,303 | B2 * | 2/2024 | Kumar ................... G03H 1/0443 |
| 11,940,565 | B2 * | 3/2024 | LaChapelle ............. G01S 17/89 |
| 11,953,628 | B2 * | 4/2024 | Ferrara ................... G02F 1/0147 |
| 2001/0048556 | A1 * | 12/2001 | Ranalli ..................... G02F 1/31 |
| | | | 359/489.05 |
| 2002/0105632 | A1 | 8/2002 | Holton |
| 2006/0132752 | A1 * | 6/2006 | Kane ........................ G01S 17/42 |
| | | | 356/5.01 |
| 2010/0187208 | A1 * | 7/2010 | Dantus ................. B23K 26/0624 |
| | | | 219/121.72 |
| 2011/0141471 | A1 * | 6/2011 | Schlotterbeck ........... G01P 5/26 |
| | | | 356/342 |
| 2012/0038885 | A1 * | 2/2012 | Cense ..................... A61B 3/102 |
| | | | 356/492 |
| 2014/0299743 | A1 | 10/2014 | Miller |
| 2015/0378241 | A1 * | 12/2015 | Eldada ..................... G02F 1/292 |
| | | | 359/299 |
| 2018/0175961 | A1 * | 6/2018 | Spector .................. G01S 7/4816 |
| 2019/0129008 | A1 * | 5/2019 | Lin ........................ G01S 7/4804 |
| 2019/0179015 | A1 * | 6/2019 | Raring ..................... F21V 29/70 |
| 2019/0179064 | A1 | 6/2019 | Zhang et al. |
| 2019/0204611 | A1 * | 7/2019 | Miller .................... G02B 27/145 |
| 2020/0150241 | A1 | 5/2020 | Byrnes et al. |
| 2020/0333312 | A1 * | 10/2020 | Islam ..................... G01N 33/442 |
| 2021/0018603 | A1 * | 1/2021 | Lu ............................ G01S 17/32 |
| 2021/0072389 | A1 * | 3/2021 | Boloorian ............... G01S 17/34 |
| 2021/0190925 | A1 * | 6/2021 | Asghari .................. G01S 7/499 |
| 2021/0349186 | A1 * | 11/2021 | Byrnes ................... G01S 7/4818 |
| 2022/0003937 | A1 | 1/2022 | Hosseini et al. |
| 2022/0075044 | A1 * | 3/2022 | Michaels ................ G01S 7/4917 |
| 2022/0206357 | A1 * | 6/2022 | Wang ..................... G02F 1/3137 |
| 2023/0052542 | A1 * | 2/2023 | Russo .................... G01S 7/4911 |
| 2024/0094357 | A1 * | 3/2024 | Smith .................... G01S 7/4876 |
| 2024/0201337 | A1 * | 6/2024 | Smith ..................... G01S 17/10 |

FOREIGN PATENT DOCUMENTS

| | | |
|---|---|---|
| EP | 3907525 A1 | 11/2021 |
| JP | 2019045200 A | 3/2019 |
| KR | 20180083983 A | 7/2018 |
| KR | 20190099329 A | 8/2019 |
| KR | 20210020912 A | 2/2021 |
| WO | WO 2021097064 A1 | 5/2021 |

OTHER PUBLICATIONS

International Searching Authority, Patent Cooperation Treaty, European Application No. PCT/US2021/037006, Notification Date: Sep. 24, 2021, 4pages.

International Searching Authority, Patent Cooperation Treaty, Written Opinion of the International Searching Authority, European Application No. PCT/US2021/037006 Notification Date: Sep. 24, 2021, 13 pages.

Office Action, KR Application No. 10-2022-7041146, Notification Date: Dec. 28, 2022, 11 pages.

* cited by examiner

LIDAR PIXEL WITH ACTIVE POLARIZATION CONTROL

CROSS-REFERENCE TO RELATED APPLICATIONS

This application is a continuation of U.S. application Ser. No. 17/344,386 filed Jun. 10, 2021, which claims benefit of U.S. Provisional Application No. 63/038,452 filed Jun. 12, 2020. Application Ser. No. 17/344,386 and U.S. Provisional Application No. 63/038,452 are expressly incorporated herein by reference in their entirety.

TECHNICAL FIELD

This disclosure relates generally to imaging and in particular to a LIDAR (Light Detection and Ranging).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more FMCW LIDAR devices for sensing its environment.

BRIEF SUMMARY OF THE INVENTION

Implementations of the disclosure include a light detection and ranging (LIDAR) system including a laser, a splitter, a polarization controller, and a dual-polarization grating coupler. The laser is configured to generate light. The splitter is configured to split the light into a plurality of lights. The polarization controller is configured to receive a first split light of the plurality of split lights. The polarization controller includes a first arm and a second arm. The first arm includes a first phase shifter and a second phase shifter that are configured to be controlled to set a phase of the first arm relative to the second arm. The grating coupler includes a first port to receive light from the first arm and a second port configured to receive light from the second arm. The dual-polarization grating coupler is configured to couple the light from the first port into a first beam having a first polarization orientation. The dual-polarization grating coupler is configured to couple the light from the second arm into a second beam with a second polarization orientation.

In an implementation, the LIDAR system further includes an optical mixer configured to receive second light of the plurality of split lights. The dual-polarization grating coupler is configured to couple reflected light having the first polarization orientation into the first arm and configured to couple the reflected light having the second polarization orientation into the second arm. The optical mixer may be configured to output an output signal in response to the reflected light and the second light.

In an implementation, the LIDAR system further includes a splitter configured to provide the first portion of the split light to the polarization controller. The splitter is also configured to provide the second light to the optical mixer.

In an implementation, the LIDAR system further includes a first stage and a second stage. The first stage including a first 2×2 splitter and the first phase shifter. The first 2×2 splitter connects to an interconnect that feeds into the optical mixer. The second stage including a second 2×2 splitter and the second phase shifter.

In an implementation, the first port of the dual-polarization grating coupler is optically coupled to the second phase shifter.

In an implementation, the second beam with the second polarization orientation is orthogonal to the first polarization orientation.

An implementation of the disclosure includes a system for an autonomous vehicle including an active polarization controlled coherent pixel array coupled to a LIDAR processing engine. Pixels in the active polarization controlled coherent pixel array include a polarization controller and a dual-polarization grating coupler. The polarization controller includes a first arm and a second arm. The first arm includes a first phase shifter and a second phase shifter that can be controlled to set a phase of the first arm relative to the second arm. The dual-polarization grating coupler includes a first port to receive light from the first arm and a second port configured to receive light from the second arm. The dual-polarization grating coupler is configured to couple the light from the first port into a first beam having a first polarization orientation. The dual-polarization grating coupler is configured to couple the light from the second arm into a second beam with a second polarization orientation.

In an implementation, the pixels in the active polarization controlled coherent pixel array include an optical mixer configured to receive second light. The dual-polarization grating coupler is configured to couple reflected light having the first polarization orientation into the first arm and configured to couple the reflected light having the second polarization orientation into the second arm. The optical mixer is configured to output an output signal in response to the reflected light and the remaining portion of the split light.

In an implementation, the pixels in the active polarization controlled coherent pixel array include a splitter configured to provide a first portion of the split light to the polarization controller. The splitter is also configured to provide the remaining portion of the split light to the optical mixer.

In an implementation, the first port of the dual-polarization grating coupler is optically coupled to the second phase shifter.

An implementation of the disclosure includes an autonomous vehicle system for an autonomous vehicle including a LIDAR pixel and one or more processors. The LIDAR pixel includes a polarization controller, a grating coupler, and an optical mixer. The polarization controller is configured to receive a first portion of split light. The polarization controller includes a first arm and a second arm. A phase shifter of the polarization controller sets a phase of first-light propagating in the first arm relative to second-light propagating in the second arm. The grating coupler is configured to output an output beam in response to receiving the first-light and the second-light. The grating coupler is configured to receive a reflected beam of the output beam. The optical mixer is configured to output a beat signal in response to receiving a remaining portion of the split light and the reflected beam. The one or more processors are configured to control the phase shifter in response to receiving the beat signal from the pixel.

In an implementation, the grating coupler is a dual-polarization grating coupler configured to couple the first-light from the first arm into a first beam having a first polarization orientation. The dual-polarization grating coupler is configured to couple the second-light from the second arm into a second beam with a second polarization orientation orthogonal to the first polarization orientation.

In an implementation, the one or more processors control the phase shifter to increase a signal level of the beat signal.

In an implementation, the one or more processors control the phase shifter to maximize a signal level of the beat signal.

In an implementation, the system for the autonomous vehicle includes a control system configured to control a powertrain of the autonomous vehicle in response to the beat signal.

In an implementation, the output beam is an infrared output beam.

In an implementation, the system for the autonomous vehicle includes a splitter configured to provide the first portion of the split light to the polarization controller. The splitter is also configured to provide the remaining portion of the split light to the optical mixer.

In an implementation, the polarization controller includes a second phase shifter.

In an implementation, the polarization controller includes a first stage and a second stage. The first stage includes a first 2×2 splitter and the phase shifter. The first 2×2 splitter connects to an interconnect that feeds into the optical mixer. The second stage includes a second 2×2 splitter and the second phase shifter.

In an implementation, a first port of the grating coupler is optically coupled to the second phase shifter.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Implementations of active polarization control for LIDAR pixels are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Frequency Modulated Continuous Wave (FMCW) LIDAR directly measures range and velocity of an object by directing a frequency modulated, collimated light beam at the object. The light that is reflected from the object is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

FMCW LIDAR can take advantage of integrated photonics for improved manufacturability and performance. Integrated photonic systems typically manipulate single optical modes using micron-scale waveguiding devices.

Coherent light generated by FMCW LIDAR reflecting off of a diffuse surface produces a speckle pattern, which is characterized by a random intensity and phase profile in the reflected optical field. This speckle field reduces the amount of power which can couple back into a single-mode optical system. As an FMCW LIDAR beam is scanned across a diffuse surface, the reflected speckle field has time-varying behavior which leads to a broadened signal spectrum.

Implementations of the disclosure include one or more coherent pixels with active polarization control. Light in the coherent pixel may be evenly split into two "arms" and then the amplitude and relative phase of the two arms of the pixel can be arbitrarily manipulated. The light in the two arms may be passed into a dual-polarization optical coupler. This coupler may couple the light into free space with two orthogonal polarizations.

By controlling the amplitude and phase of the two arms of the coherent pixel, the output polarization of light can be arbitrarily selected. Alternatively, by controlling the amplitude and phase of the two arms of the coherent pixel, it can be made arbitrarily sensitive to receiving a particular polarization of light.

Figure 1A:
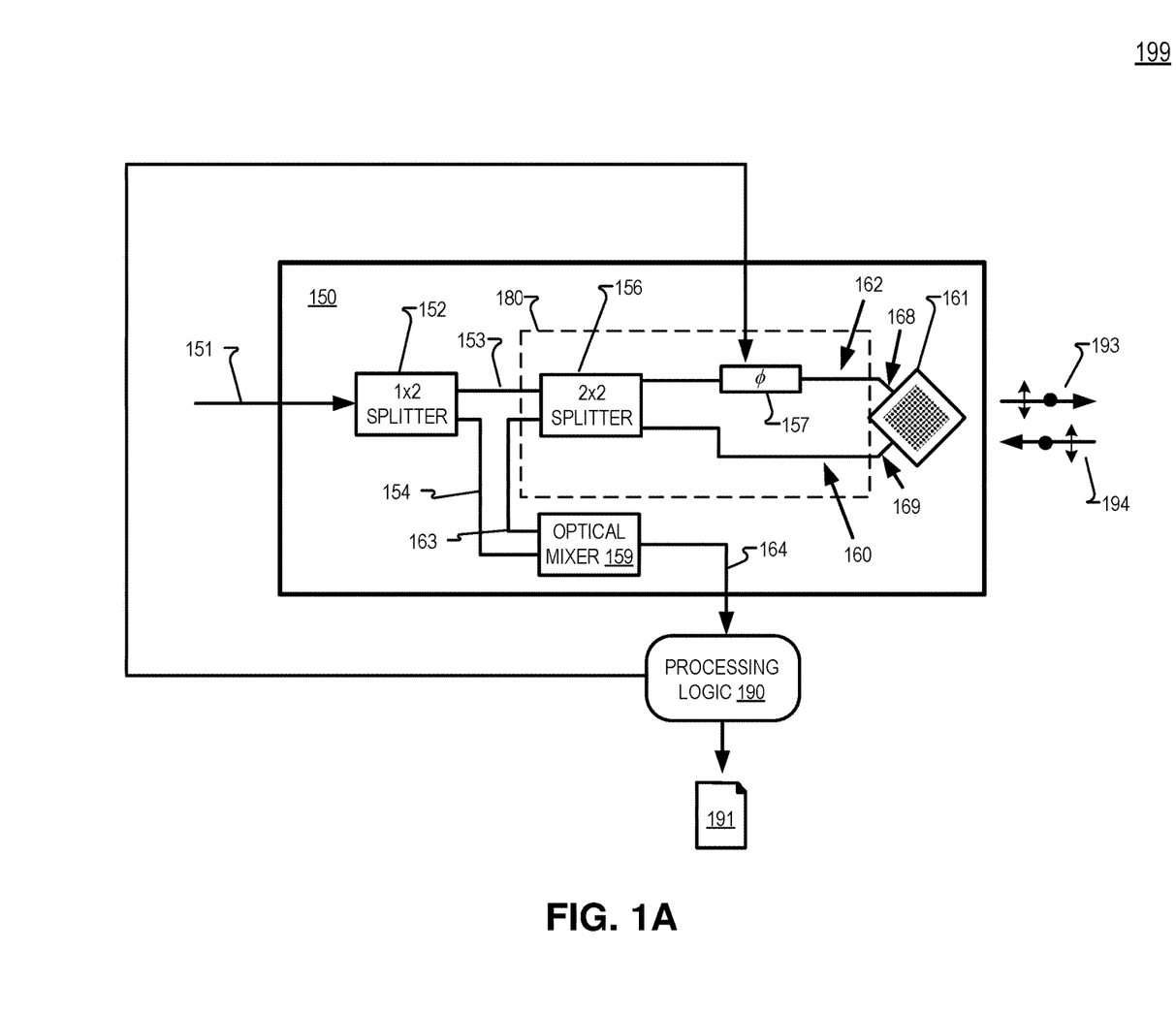
FIG. 1A illustrates an example LIDAR device including a LIDAR pixel having active polarization control, in accordance with implementations of the disclosure.

FIG. 1A illustrates an example LIDAR device 199 including a LIDAR pixel 150 having active polarization control, in accordance with implementations of the disclosure. LIDAR pixel 150 in FIG. 1A includes a 1×2 splitter 152, an optical mixer 159, a grating coupler 161, and a polarization controller 180. Polarization controller 180 includes a 2×2 splitter 156 and a phase shifter 157. Polarization controller 180 includes a top arm 162 and a bottom arm 160.

Light 151 entering LIDAR pixel 150 can be split by a splitter (e.g. 1×2 splitter 152). Light 151 may be infrared laser light generated by a laser (e.g. a continuous wave laser). In some implementations, the laser light may be collimated. The split ratio of splitter 152 may be selected as desired for the FMCW LIDAR system. A portion (e.g. between 70% and 99%) of this split light propagates through an interconnect 153 to 2×2 splitter 156. The remaining light (e.g. between 1% and 30%) leaving the bottom output port of 1×2 splitter 152 propagates through an interconnect 154 to optical mixer 159. In some implementations, input light 151 and 1×2 splitter 152 may be replaced with two independent light sources.

In the transmit direction, polarization controller 180 is configured to receive a first portion of the split light that is split by 1×2 splitter 152. The first portion of the split light propagates to polarization controller 180 by way of interconnect 153. Light entering the 2×2 splitter 156 is split between its two output ports. The top output port of 2×2 splitter 156 starts the "top arm" 162 of polarization controller 180 and the bottom port of 2×2 splitter 156 starts the "bottom arm" 160 of polarization controller 180. In some implementations, the split ratio between the top port and the bottom port of 2×2 splitter 156 is 50:50, however other split ratios may be selected if desired. Light in the top arm 162 passes through phase shifter 157 which can be controlled in order to arbitrarily set the phase of the light in top arm 162 relative to bottom arm 160.

Phase shifter 157 sets a phase of top-light propagating in top arm 162 relative to bottom-light propagating in bottom arm 160. In FIG. 1A, processing logic 190 is configured to control phase shifter 157. Light in top arm 162 propagates into a top port 168 of grating coupler 161 while light in the bottom arm 160 propagates into a bottom port 169 of grating coupler 161. Grating coupler 161 may be a dual-polarization grating coupler configured to outcouple a first polarization orientation of light and a second polarization orientation of light that is orthogonal to the first polarization orientation of light. Grating coupler 161 couples light from top port 168 into a first polarization beam (e.g. "TE" polarized beam) and couples light from bottom port 169 into a second polarization beam (e.g. "TM" polarized beam), in some implementations. These two orthogonal beams superimpose to form an output beam of light 193 with arbitrary polarization which is determined by the state of phase shifter 157. Thus, grating coupler 161 is configured to output an output beam of light 193 in response to receiving top-light propagating in top arm 162 and bottom-light propagating in bottom arm 160.

In the illustrated implementation, grating coupler 161 is presented as the "antenna." However, an equivalent, alternative, or similar system can be implemented using polarization rotators, polarization combiners, or edge emitters.

In the receive direction, arbitrarily-polarized light 194 enters grating coupler 161. Light with the first polarization couples into top arm 162 and passes through phase shifter 157. Light with the second polarization couples into bottom arm 160. The light in both arms then passes through 2×2 splitter 156. Phase shifter 157 can be controlled such that a maximum amount of light couples into the bottom port of 2×2 splitter 156 which connects to interconnect 163. The light in interconnect 163 is fed into optical mixer 159, which combines it with the light in interconnect 154. The light in interconnect 154 is the remaining light from the first portion of light propagating in interconnect 153. Thus, optical mixer 159 is configured to output an output signal 164 in response to receiving the remaining portion of the split light and the reflected beam 194 (propagating through bottom arm 160 and 2×2 splitter 156). Optical mixer 159 converts these mixed optical signals (light in interconnects 163 and interconnects 154) to the electrical domain, producing one or more output signals 164. For example, output signal 164 may be an electronic signal such as a "beat signal."

As described above, phase shifter 157 sets a phase of top-light propagating in top arm 162 relative to bottom-light propagating in bottom arm 160. In the illustrated implementation of FIG. 1A, processing logic 190 is configured to control phase shifter 157 in response to receiving beat signal 164 from LIDAR pixel 150. In some implementations, processing logic 190 is configured to drive phase shifter 157 to different phase values and then select the phase value that generates the beat signal 164 with the highest amplitude and drive that selected phase value onto phase shifter 157 to increase or even maximize a signal level of the beat signal 164. As different target surfaces reflect different polarization orientations, processing logic 190 may drive phase shifter 157 to different phase values that increase an amplitude of beat signal 164 due to the different polarizations of light reflected by different target surfaces. In some implementations, processing logic 190 receives beat signals 164 from a plurality of LIDAR pixels 150 and generates an image 191 from the plurality of beat signals.

Figure 1B:
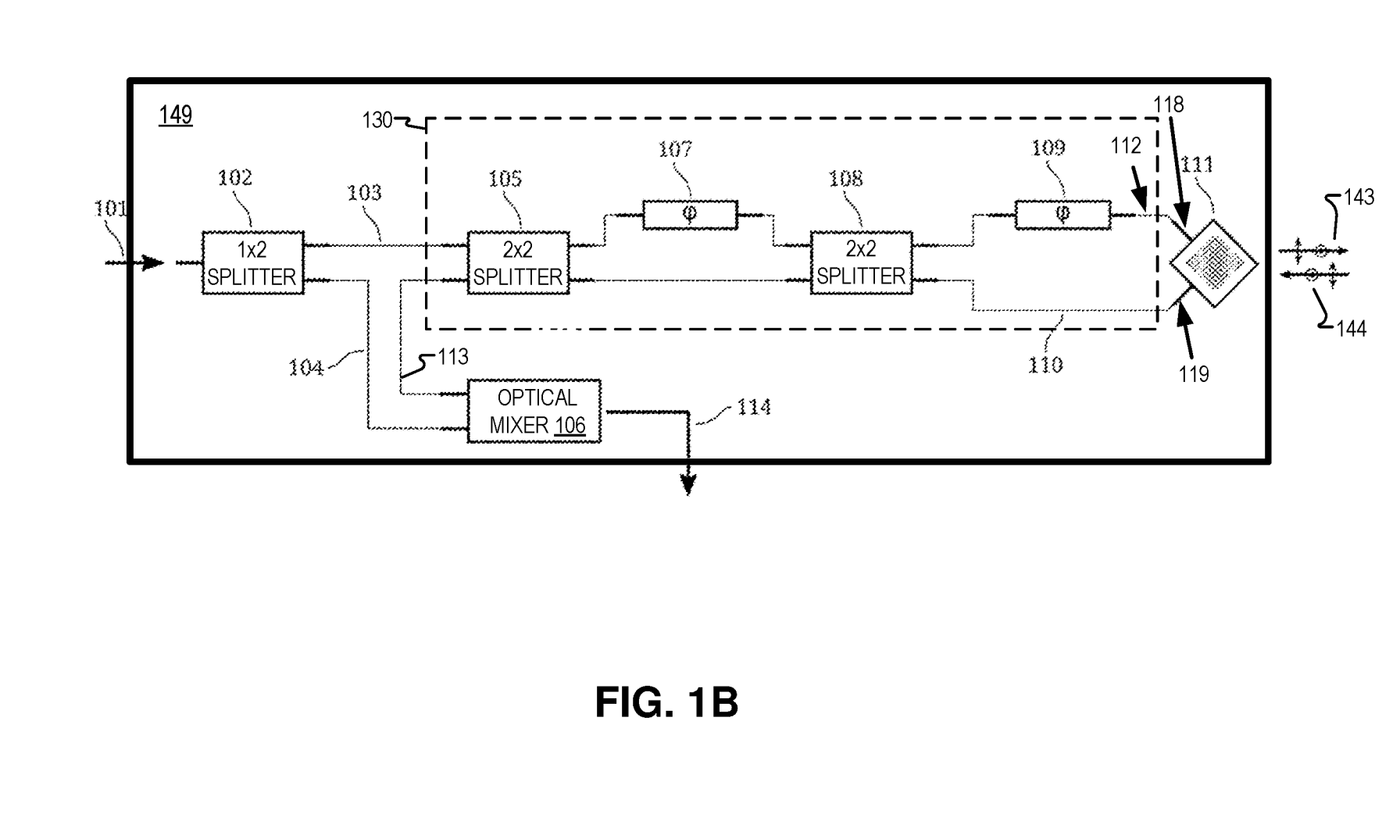
FIG. 1B illustrates an example LIDAR pixel including a first phase shifter and a second phase shifter for active polarization control, in accordance with implementations of the disclosure.

FIG. 1B illustrates an example LIDAR pixel 149 including a first phase shifter 107 and a second phase shifter 109 for active polarization control, in accordance with implementations of the disclosure. Light 101 entering the coherent pixel 149 can be split by a splitter (e.g. 1×2 splitter 102). The split ratio of this splitter may be selected as desired for the FMCW LIDAR system. A portion of this split light (e.g. between 70% and 99%) propagates through an interconnect 103 to a 2×2 splitter 105. The remaining light (e.g. between 1% and 30%) leaving the bottom output port of the 1×2 splitter propagates through an interconnect 104 to an optical mixer 106. In some implementations, input light 101 and 1×2 splitter 102 may be replaced with two independent light sources.

In the transmit direction, light entering the 2×2 splitter 105 is split between its two output ports (which constitute the first stage of the polarization controller 130 with a "top arm" and "bottom arm"). The first stage includes first 2×2 splitter 105 and first phase shifter 107. In an implementation of coherent pixel 149, the split ratio is 50:50, however other split ratios may be selected if desired. Light in the top arm passes through a first phase shifter 107 which can be controlled in order to arbitrarily set the phase of the light in the top arm relative to the bottom arm.

The light in the top and bottom arms enter a second 2×2 splitter 108 (the second stage of polarization controller 130). The second stage includes second 2×2 splitter 108 and second phase shifter 109. Depending on the phase shift of the two arms, the amplitude of light leaving the top and bottom ports of splitter 108 can be controlled. Light in the top arm of this second stage passes through second phase shifter 109 which can be controlled to arbitrarily set the relative phase of the top and bottom arms of the second stage. Light in the top arm propagates into the top port 118 of the dual-polarization grating coupler 111 while light in the bottom arm 110 propagates into the bottom port 119 of the dual-polarization grating coupler 111. Top port 118 is optically coupled to second phase shifter 109. The grating coupler 111 couples light from the top port 118 into a first polarized beam and couples light from the bottom port 119 into a second orthogonal polarized beam. These two orthogonal beams superimpose to form a beam of light 143 with arbitrary polarization which is determined by the state of the two phase shifters 107 and 109.

In the illustrated implementation, dual-polarization grating coupler 111 is presented as the "antenna." However, an equivalent, alternative, or similar system can be implemented using polarization rotators, polarization combiners, or edge emitters.

In the receive direction, arbitrarily-polarized light 144 enters dual-polarization grating coupler 111. Light with the first polarization couples into the top arm 112 of the second stage and passes through second phase shifter 109. Light with the second polarization couples into the bottom arm 110 of the second stage. The light in both arms then passes through the 2×2 splitter 108, entering the first stage. Light in the top arm of the first stage passes through first phase shifter 107. Light in both arms of the first stage pass through the 2×2 splitter 105. First phase shifter 107 and second phase shifter 109 can be controlled such that a maximum amount of light couples into the bottom port of 2×2 splitter 105 which connects to interconnect 113. The light in 113 is fed into the optical mixer 106, which combines it with the light in interconnect 104. Optical mixer 106 converts this mixed optical signal to the electrical domain, producing one or more output signals 114.

Figure 2:
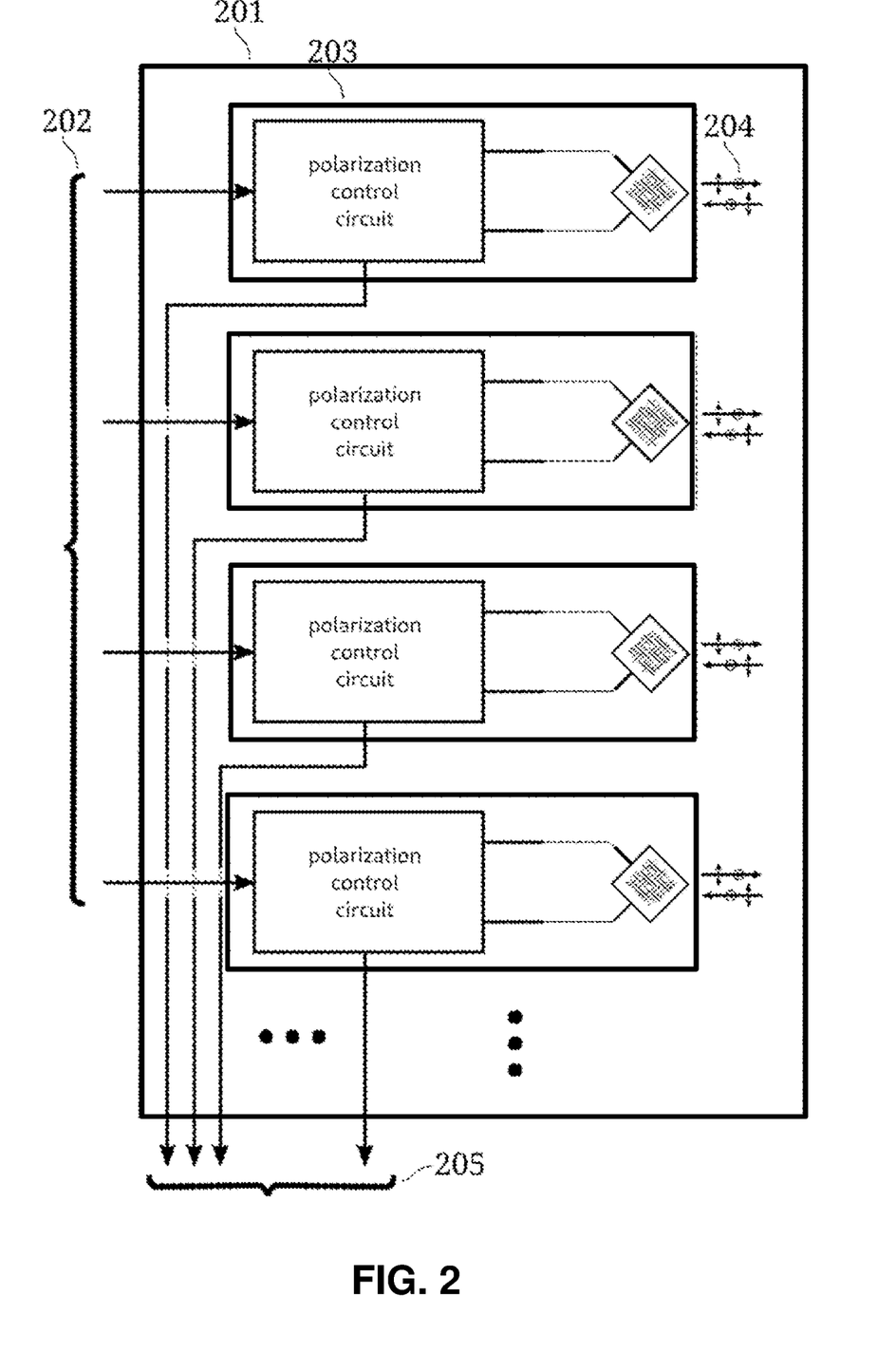
FIG. 2 demonstrates how more than one coherent pixel with active polarization control can be combined into a focal plane array (FPA), in accordance with implementations of the disclosure.

FIG. 2 demonstrates how more than one coherent pixel 203 with active polarization control can be combined into a focal plane array (FPA) 201, in accordance with implementations of the disclosure. Coherent pixel 203 may be implemented with the designs of LIDAR pixel 149 and/or LIDAR pixel 150. Multiple optical channels 202 enter the array. These can be discrete parallel channels or switched between the pixels using an optical circuit. In some implementations, the same continuous wave (CW) infrared laser provides laser light for each of the optical channels 202. Waveguides, optical fibers, micro-optical components, optical amplifiers and/or photonic circuits may be implemented so that each of channels 202 receives a portion of the laser light from the CW infrared laser. Light enters each coherent pixel (e.g. 203) which manipulates, transmits, and receives the light with arbitrary polarizations 204 as previously described. The received light is converted into an array of output electrical signals 205. Image processing may be performed on the array of output electrical signals 205 to generate an image of an environment imaged by FPA 201.

Figure 3:
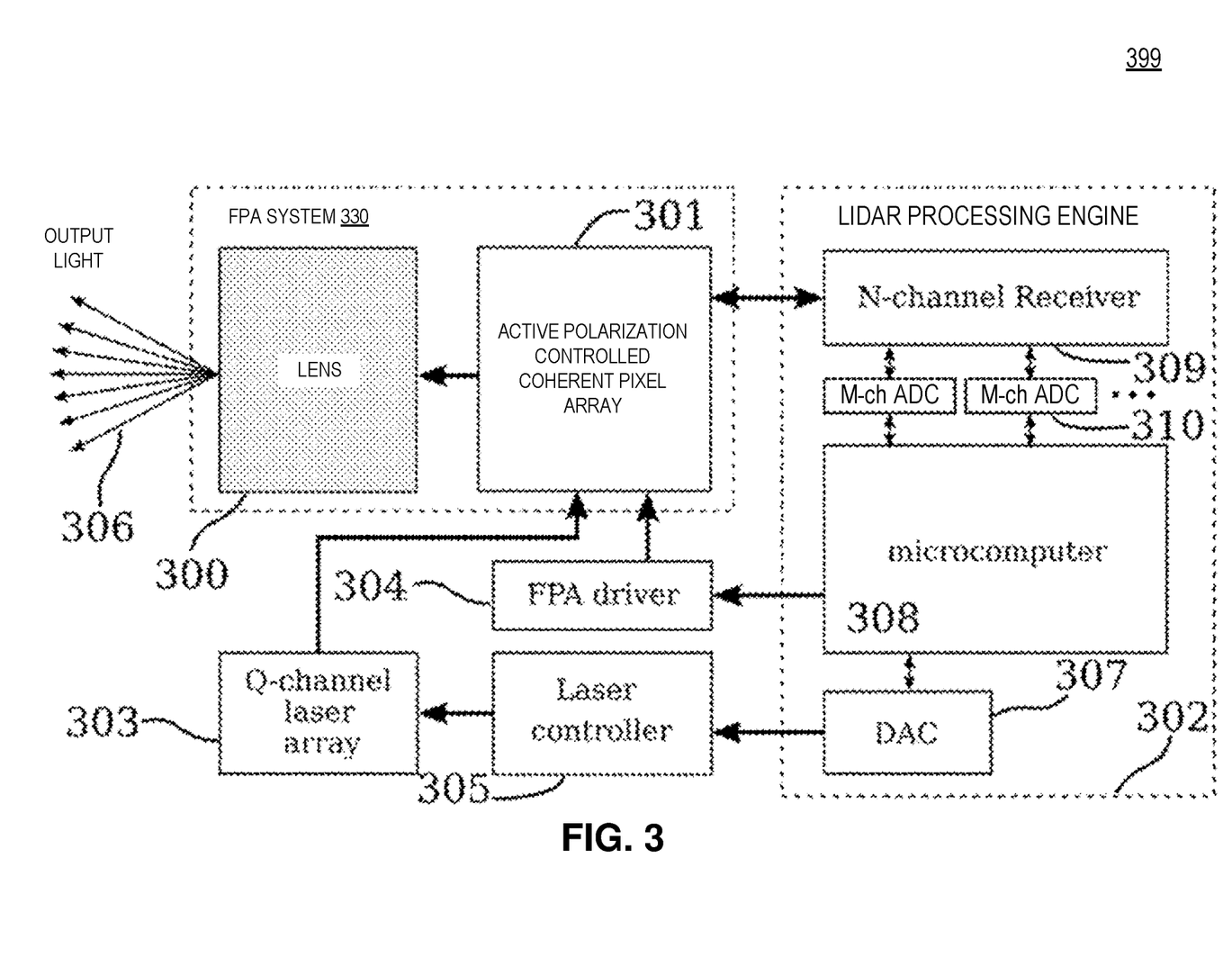
FIG. 3 demonstrates how an array of coherent pixels with active polarization control can be used in an FMCW LIDAR system, in accordance with implementations of the disclosure.

FIG. 3 demonstrates how the array of coherent pixels with active polarization control can be used in an FMCW LIDAR system 399, in accordance with implementations of the disclosure. In FIG. 3, a lens 300 takes input from active polarization controlled coherent pixel array 301. Active polarization controlled coherent pixel array 301 may include FPA 201 in some implementations. Lens 300 also receives output beams with a range of angles 306. The pixels in the active polarization controlled coherent pixel array 301 are controlled by an FPA driver module 304. An individual pixel in the array may be turned on to emit and receive light or multiple simultaneous pixels in the array may be turned on to simultaneously emit or receive light. Light emitted by the active polarization controlled coherent pixel array 301 is produced by a laser array with Q parallel channels 303. This laser array may be integrated directly with the active polarization controlled coherent pixel array 301 or may be a separate module packaged alongside active polarization controlled coherent pixel array 301. The laser array is controlled by a laser driver module 305, which receives control signals from a LIDAR processing engine 302 via a digital to analog converter (DAC) 307. LIDAR processing engine 302 also controls FPA driver 304 and sends and receives data from active polarization controlled coherent pixel array 301.

LIDAR processing engine 302 includes a microcomputer 308. Microcomputer 308 may process data coming from FPA system 330 and send control signals to FPA system 330 via FPA driver 304 and laser controller 305. Signals are received by N-channel receiver 309 of LIDAR processing engine 302. These incoming signals are digitized using a set of M-channel analog to digital converters (ADC) 310 and microcomputer 308 is configured to receive the digitized version of the signals.

Figure 4A:
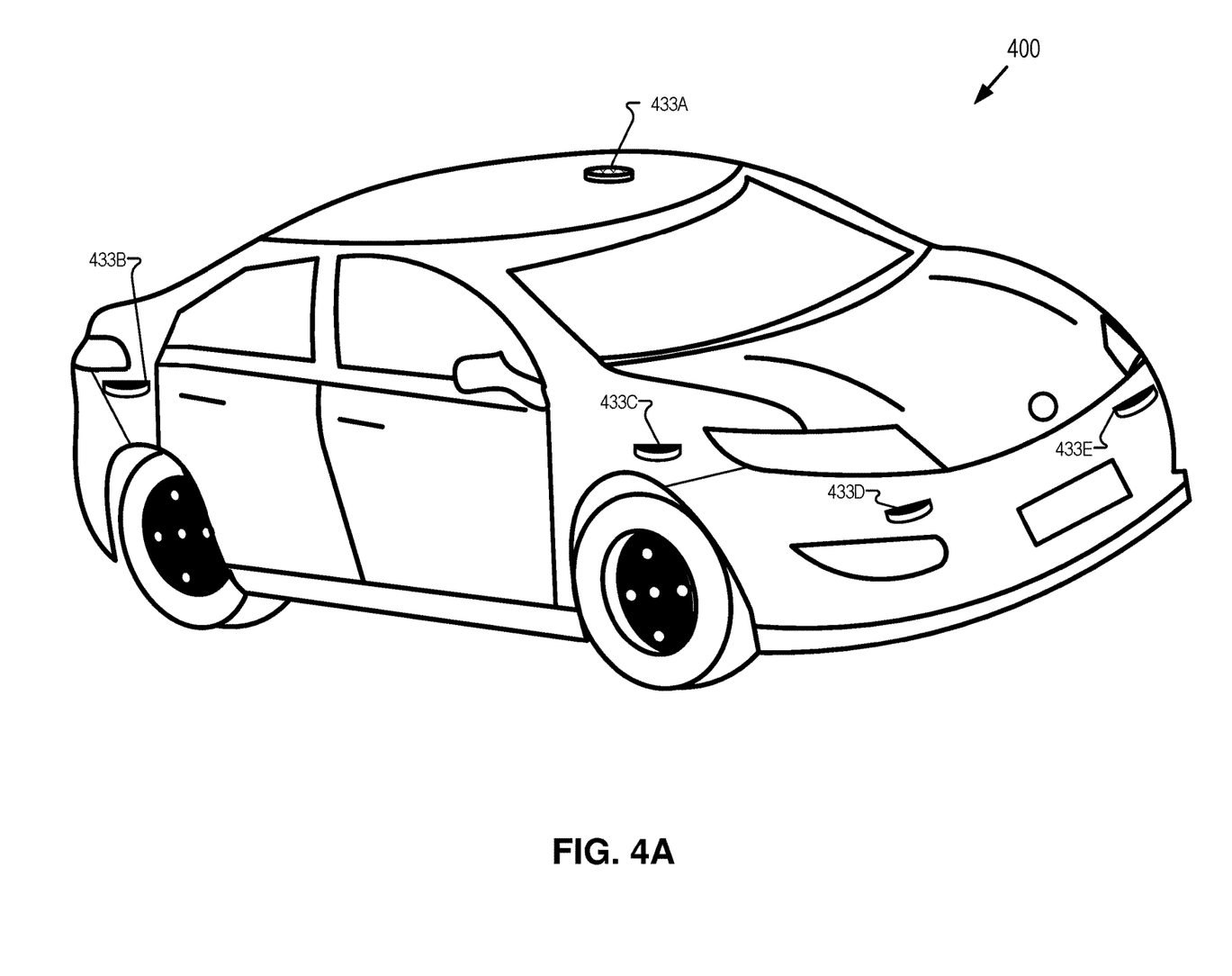
FIG. 4A illustrates an autonomous vehicle including an array of example sensors, in accordance with implementations of the disclosure.
Figure 4B:
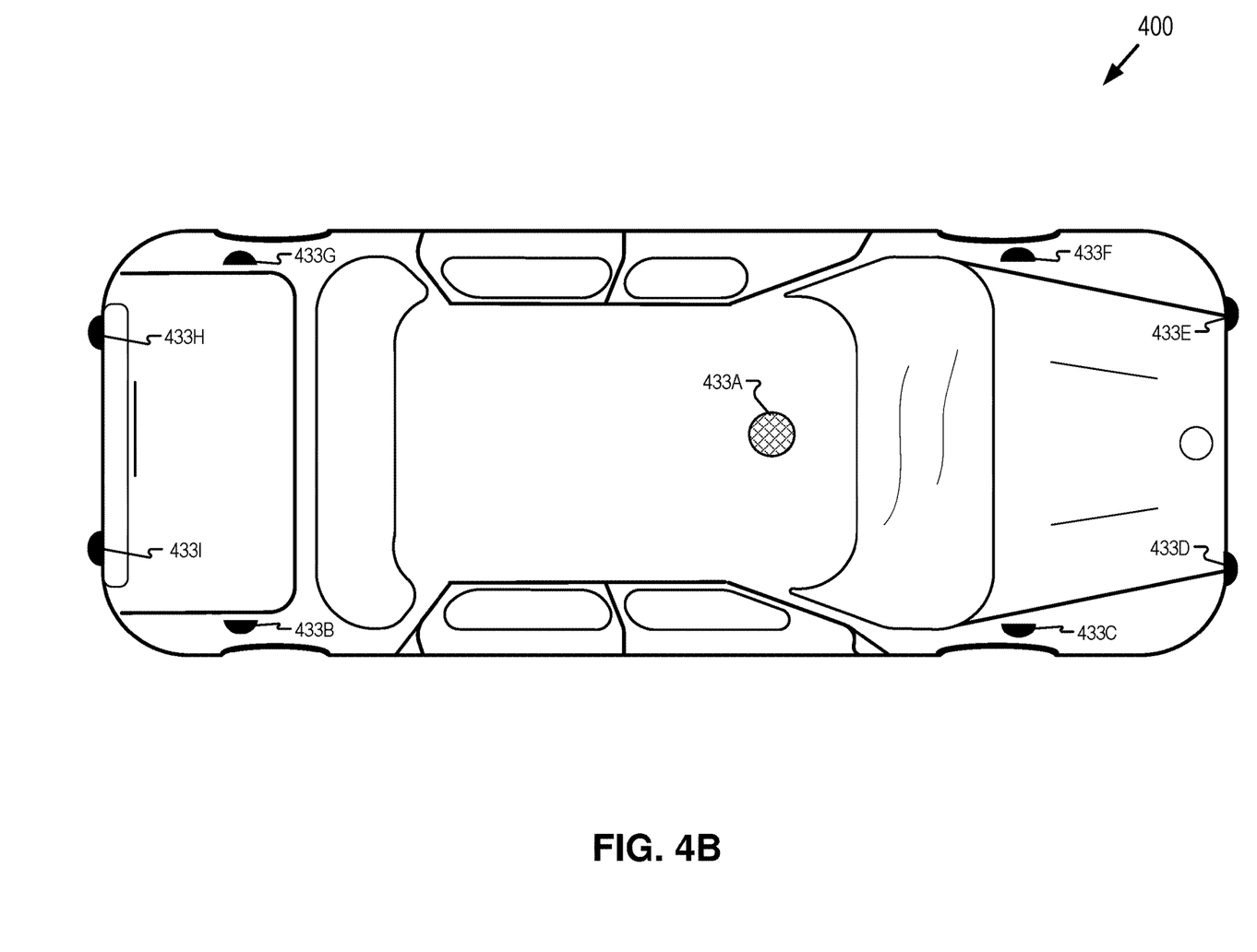
FIG. 4B illustrates a top view of an autonomous vehicle including an array of example sensors, in accordance with implementations of the disclosure.
Figure 4C:
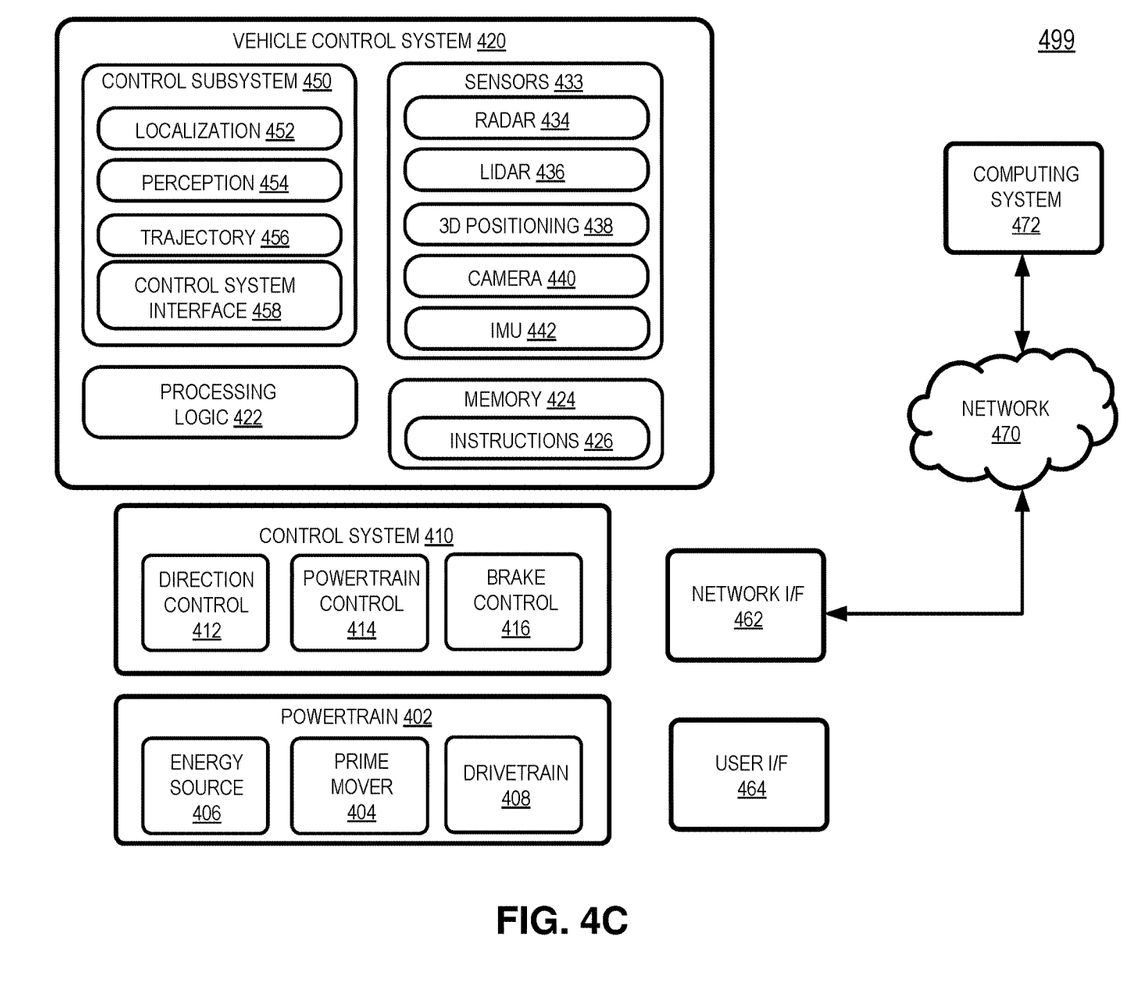
FIG. 4C illustrates an example vehicle control system including sensors, a drivetrain, and a control system, in accordance with implementations of the disclosure.

FIG. 4A illustrates an example autonomous vehicle 400 that may include the LIDAR designs of FIGS. 1A-3, in accordance with aspects of the disclosure. The illustrated autonomous vehicle 400 includes an array of sensors configured to capture one or more objects of an external environment of the autonomous vehicle and to generate sensor data related to the captured one or more objects for purposes of controlling the operation of autonomous vehicle 400. FIG. 4A shows sensor 433A, 433B, 433C, 433D, and 433E. FIG. 4B illustrates a top view of autonomous vehicle 400 including sensors 433F, 433G, 433H, and 433I in addition to sensors 433A, 433B, 433C, 433D, and 433E. Any of sensors 433A, 433B, 433C, 433D, 433E, 433F, 433G, 433H, and/or 433I may include LIDAR devices that include the designs of FIGS. 1A-3. FIG. 4C illustrates a block diagram of an example system 499 for autonomous vehicle 400. For example, autonomous vehicle 400 may include powertrain 402 including prime mover 404 powered by energy source 406 and capable of providing power to drivetrain 408. Autonomous vehicle 400 may further include control system 410 that includes direction control 412, powertrain control 414, and brake control 416. Autonomous vehicle 400 may be implemented as any number of different vehicles, including vehicles capable of transporting people and/or cargo and capable of traveling in a variety of different environments. It will be appreciated that the aforementioned components 402-416 can vary widely based upon the type of vehicle within which these components are utilized.

The implementations discussed hereinafter, for example, will focus on a wheeled land vehicle such as a car, van, truck, or bus. In such implementations, prime mover 404 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 408 may include wheels and/or tires along with a transmission and/or any other mechanical drive components suitable for converting the output of prime mover 404 into vehicular motion, as well as one or more brakes configured to controllably stop or slow the autonomous vehicle 400 and direction or steering components suitable for controlling the trajectory of the autonomous vehicle 400 (e.g., a rack and pinion steering linkage enabling one or more wheels of autonomous vehicle 400 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 412 may include one or more actuators and/or sensors for controlling and receiving feedback from the direction or steering components to enable the autonomous vehicle 400 to follow a desired trajectory. Powertrain control 414 may be configured to control the output of powertrain 402, e.g., to control the output power of prime mover 404, to control a gear of a transmission in drivetrain 408, thereby controlling a speed and/or direction of the autonomous vehicle 400. Brake control 416 may be configured to control one or more brakes that slow or stop autonomous vehicle 400, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 400 is implemented in vehicle control system 420, which may include one or more processors in processing logic 422 and one or more memories 424, with processing logic 422 configured to execute program code (e.g. instructions 426) stored in memory 424. Processing logic 422 may include graphics processing unit(s) (GPUs) and/or central processing unit(s) (CPUs), for example. Vehicle control system 420 may be configured to control powertrain 402 of autonomous vehicle 400 in response to an output of the optical mixer of a LIDAR pixel such as LIDAR pixel 149 or 150. Vehicle control system 420 may be configured to control powertrain 402 of autonomous vehicle 400 in response to outputs from a plurality of LIDAR pixels. Vehicle control system 420 may be configured to control powertrain 402 of autonomous vehicle 400 in response to outputs from microcomputer 308 generated based on signals received from FPA system 330.

Sensors 433A-433I may include various sensors suitable for collecting data from an autonomous vehicle's surrounding environment for use in controlling the operation of the autonomous vehicle. For example, sensors 433A-433I can include RADAR unit 434, LIDAR unit 436, 3D positioning sensor(s) 438, e.g., a satellite navigation system such as GPS, GLONASS, BeiDou, Galileo, or Compass. The LIDAR designs of FIGS. 1A-3 may be included in LIDAR unit 436. LIDAR unit 436 may include a plurality of LIDAR sensors that are distributed around autonomous vehicle 400, for example. In some implementations, 3D positioning sensor(s) 438 can determine the location of the vehicle on the Earth using satellite signals. Sensors 433A-433I can optionally include one or more ultrasonic sensors, one or more cameras 440, and/or an Inertial Measurement Unit (IMU) 442. In some implementations, camera 440 can be a monographic or stereographic camera and can record still and/or video images. Camera 440 may include a Complementary Metal-Oxide-Semiconductor (CMOS) image sensor configured to capture images of one or more objects in an external environment of autonomous vehicle 400. IMU 442 can include multiple gyroscopes and accelerometers capable of detecting linear and rotational motion of autonomous vehicle 400 in three directions. One or more encoders (not illustrated) such as wheel encoders may be used to monitor the rotation of one or more wheels of autonomous vehicle 400.

The outputs of sensors 433A-433I may be provided to control subsystems 450, including, localization subsystem 452, trajectory subsystem 456, perception subsystem 454, and control system interface 458. Localization subsystem 452 is configured to determine the location and orientation (also sometimes referred to as the "pose") of autonomous vehicle 400 within its surrounding environment, and generally within a particular geographic area. The location of an autonomous vehicle can be compared with the location of an additional vehicle in the same environment as part of generating labeled autonomous vehicle data. Perception subsystem 454 may be configured to detect, track, classify, and/or determine objects within the environment surrounding autonomous vehicle 400. Trajectory subsystem 456 is configured to generate a trajectory for autonomous vehicle 400 over a particular timeframe given a desired destination as well as the static and moving objects within the environment. A machine learning model in accordance with several implementations can be utilized in generating a vehicle trajectory. Control system interface 458 is configured to communicate with control system 410 in order to implement the trajectory of the autonomous vehicle 400. In some implementations, a machine learning model can be utilized to control an autonomous vehicle to implement the planned trajectory.

It will be appreciated that the collection of components illustrated in FIG. 4C for vehicle control system 420 is merely exemplary in nature. Individual sensors may be omitted in some implementations. In some implementations, different types of sensors illustrated in FIG. 4C may be used for redundancy and/or for covering different regions in an environment surrounding an autonomous vehicle. In some implementations, different types and/or combinations of control subsystems may be used. Further, while subsystems 452-458 are illustrated as being separate from processing logic 422 and memory 424, it will be appreciated that in some implementations, some or all of the functionality of subsystems 452-458 may be implemented with program code such as instructions 426 resident in memory 424 and executed by processing logic 422, and that these subsystems 452-458 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 420 may be networked in various manners.

In some implementations, autonomous vehicle 400 may also include a secondary vehicle control system (not illustrated), which may be used as a redundant or backup control system for autonomous vehicle 400. In some implementations, the secondary vehicle control system may be capable of operating autonomous vehicle 400 in response to a particular event. The secondary vehicle control system may only have limited functionality in response to the particular event detected in primary vehicle control system 420. In still other implementations, the secondary vehicle control system may be omitted.

In some implementations, different architectures, including various combinations of software, hardware, circuit logic, sensors, and networks may be used to implement the various components illustrated in FIG. 4C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 400, e.g., any cache memory in a processor, as well as any storage capacity used as a virtual memory, e.g., as stored on a mass storage device or another computer controller. Processing logic 422 illustrated in FIG. 4C, or entirely separate processing logic, may be used to implement additional functionality in autonomous vehicle 400 outside of the purposes of autonomous control, e.g., to control entertainment systems, to operate doors, lights, or convenience features.

In addition, for additional storage, autonomous vehicle 400 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 400 may include a user interface 464 to enable autonomous vehicle 400 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 400 may include one or more network interfaces, e.g., network interface 462, suitable for communicating with one or more networks 470 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 400 receives environmental and other data for use in autonomous control thereof. In some implementations, data collected by one or more sensors 433A-433I can be uploaded to computing system 472 through network 470 for additional processing.

In such implementations, a time stamp can be associated with each instance of vehicle data prior to uploading.

Processing logic 422 illustrated in FIG. 4C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 400 through network 470, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 4C is not intended to limit implementations disclosed herein. Indeed, those skilled in the art will recognize that other alternative hardware and/or software environments may be used without departing from the scope of implementations disclosed herein.

The term "processing logic" (e.g. processing logic 190 or 422) in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A light detection and ranging (LIDAR) system comprising:
    a laser configured to generate light; and
    one or more LIDAR pixels, wherein at least one of the one or more LIDAR pixels includes:
        a splitter configured to split the light into a first portion of the light and a second portion of the light;
        a grating coupler configured to emit a transmit beam that is based on a combination of the first portion of the light and the second portion of the light;
        one or more first interconnects configured to provide the first portion of the light from the splitter to the grating coupler;
        one or more second interconnects configured to provide the second portion of the light from the splitter to the grating coupler; and
        a phase shifter coupled to the one or more first interconnects and configured to vary a phase of the first portion of the light relative to a phase of the second portion of the light, wherein the phase of the first portion of the light is selected from a plurality of greater than two different phase values.

2. The LIDAR system of claim 1 further comprising:
    an optical mixer configured to receive a third portion of the light originating from the laser, wherein the grating coupler is configured to couple reflected light having a first polarization orientation into the one or more first interconnects and configured to couple the reflected light having a second polarization orientation into the one or more second interconnects,
    wherein the optical mixer is configured to output an output signal in response to the reflected light,
    wherein the reflected light is the transmit beam reflected from at least one object in a LIDAR operating environment.

3. The LIDAR system of claim 2, wherein the splitter is coupled to the optical mixer to provide the reflected light to the optical mixer.

4. The LIDAR system of claim 2, wherein the splitter is first 2×2 splitter, wherein the at least one of the one or more LIDAR pixels further includes a second 2×2 splitter, wherein the second 2×2 splitter is coupled between the first 2×2 splitter and the grating coupler with the one or more first interconnects and the one or more second interconnects.

5. The LIDAR system of claim 2, wherein a polarization of the reflected light is at least partially based on one or more surfaces of the at least one object.

6. The LIDAR system of claim 1, wherein the one or more first interconnects are coupled between the splitter and the grating coupler, wherein the one or more second interconnects are coupled between the splitter and the grating coupler, wherein the phase shifter is coupled to the one or more first interconnects between the splitter and the grating coupler.

7. The LIDAR system of claim 1, wherein the grating coupler is a dual-polarization grating coupler, wherein the transmit beam includes a first transmit beam having a first polarization orientation and a second transmit beam having a second polarization orientation.

8. The LIDAR system of claim 7, wherein the first polarization orientation of the first transmit beam is orthogonal to the second polarization orientation of the second transmit beam.

9. An autonomous vehicle control system for an autonomous vehicle, the autonomous vehicle control system comprising:
- a laser configured to generate light;
- a light detection and ranging (LIDAR) processing engine; and
- one or more LIDAR pixels coupled to the LIDAR processing engine, wherein at least one of the one or more LIDAR pixels includes:
  - a splitter configured to split the light into a first portion of the light and a second portion of the light;
  - a grating coupler configured to emit a transmit beam that is based on a combination of the first portion of the light and the second portion of the light;
  - one or more first interconnects configured to provide the first portion of the light from the splitter to the grating coupler;
  - one or more second interconnects configured to provide the second portion of the light from the splitter to the grating coupler; and
  - a phase shifter coupled to the one or more first interconnects and configured to vary a phase of the first portion of the light relative to a phase of the second portion of the light, wherein the phase of the first portion of the light is selected from a plurality of greater than two different phase values.

10. The autonomous vehicle control system of claim 9 further comprising:
- an optical mixer configured to receive a third portion of the light originating from the laser, wherein the grating coupler is configured to couple reflected light having a first polarization orientation into the one or more first interconnects and configured to couple the reflected light having a second polarization orientation into the one or more second interconnects,
- wherein the optical mixer is configured to output an output signal in response to the reflected light,
- wherein the reflected light is the transmit beam reflected from at least one object in a LIDAR operating environment.

11. The autonomous vehicle control system of claim 10, wherein the splitter is coupled to the optical mixer to provide the reflected light to the optical mixer.

12. The autonomous vehicle control system of claim 10, wherein the splitter is first 2×2 splitter, wherein the at least one of the one or more LIDAR pixels further includes a second 2×2 splitter, wherein the second 2×2 splitter is coupled between the first 2×2 splitter and the grating coupler with the one or more first interconnects and the one or more second interconnects.

13. The autonomous vehicle control system of claim 12, wherein the phase shifter is a first phase shifter coupled between the first 2×2 splitter and the second 2×2 splitter, wherein the at least one of the one or more LIDAR pixels further includes a second phase shifter coupled to the one or more first interconnects, wherein the second phase shifter is coupled between the second 2×2 splitter and the grating coupler.

14. The autonomous vehicle control system claim 10, wherein a polarization of the reflected light is at least partially based on one or more surfaces of the at least one object.

15. The autonomous vehicle control system of claim 9, wherein the grating coupler is a dual-polarization grating coupler, wherein the transmit beam includes a first transmit beam having a first polarization orientation and a second transmit beam having a second polarization orientation.

16. The autonomous vehicle control system of claim 15, wherein the first polarization orientation of the first transmit beam is orthogonal to the second polarization orientation of the second transmit beam.

17. The autonomous vehicle control system of claim 9, wherein the LIDAR processing engine is configured to control the phase shifter to increase a signal level a beat signal that is based on returning light coupled into the at least one of the one or more LIDAR pixels by the grating coupler.

18. The autonomous vehicle control system of claim 9, wherein the transmit beam is an infrared output beam.

19. An autonomous vehicle comprising:
- a laser configured to generate light;
- a light detection and ranging (LIDAR) processing engine;
- one or more LIDAR pixels coupled to the LIDAR processing engine, wherein at least one of the one or more LIDAR pixels includes:
  - a splitter configured to split the light into a first portion of the light and a second portion of the light;
  - a grating coupler configured to emit a transmit beam that is based on a combination of the first portion of the light and the second portion of the light;
  - one or more first interconnects configured to provide the first portion of the light from the splitter to the grating coupler,
  - one or more second interconnects configured to provide the second portion of the light from the splitter to the grating coupler; and
  - a phase shifter coupled to the one or more first interconnects and configured to vary a phase of the first portion of the light relative to a phase of the second portion of the light, wherein the phase of the first portion of the light is selected from a plurality of greater than two different phase values; and
- one or more processors configured to control the autonomous vehicle based on a return signal received by the at least one of the one or more LIDAR pixels.

20. The autonomous vehicle of claim 19 further comprising:
- an optical mixer configured to receive a third portion of the light originating from the laser, wherein the grating coupler is configured to couple reflected light having a first polarization orientation into the one or more first interconnects and configured to couple the reflected light having a second polarization orientation into the one or more second interconnects,
- wherein the optical mixer is configured to output the return signal in response to the reflected light,
- wherein the reflected light is the transmit beam reflected from at least one object in a LIDAR operating environment.

* * * * *